No. 651,034. Patented June 5, 1900.
J. B. GILLASPIE.
HARROW.
(Application filed May 31, 1899.)
(No Model.)
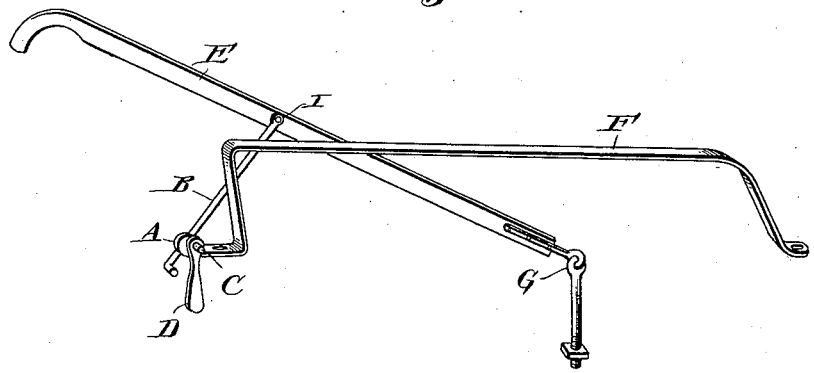
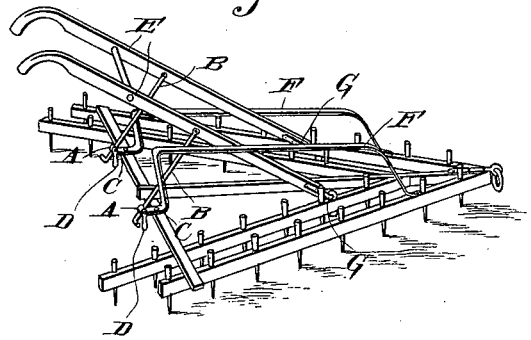
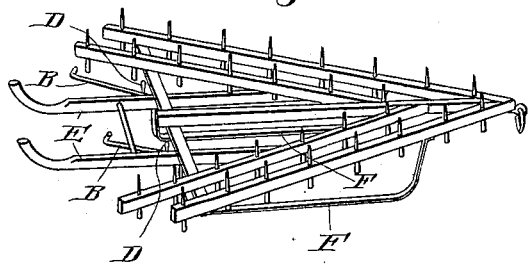
Witnesses:
Cleona Searles
Theodore Searles
Inventor:
John B. Gillaspie

UNITED STATES PATENT OFFICE.

JOHN B. GILLASPIE, OF MOUNT PISGAH, OHIO.

HARROW.

SPECIFICATION forming part of Letters Patent No. 651,034, dated June 5, 1900.

Application filed May 31, 1899. Serial No. 718,862. (No model.)

*To all whom it may concern:*

Be it known that I, JOHN B. GILLASPIE, residing at Mount Pisgah, in the county of Clermont and State of Ohio, have invented a new and useful Improvement in Harrows, of which the following is a specification.

My invention is a combination harrow and runners with adjustable handles.

The object of my improvement is to provide a convenient and handy contrivance on harrows for moving them about when required and avoid handles and teeth from being in contact with the ground when the harrow is inverted. I attain this object by the mechanism illustrated in the accompanying drawings, in which—

Figure 1 is a side view of my improvement in its several parts together. Fig. 2 is a perspective view of a harrow, showing the combination and my invention and how applied. Fig. 3 is a perspective view of the entire implement inverted and on its own runners ready for moving about, with the handles and teeth out of the way of contact with the ground.

Similar letters show similar parts in the different views, as follows:

In Fig. 1, A is a socket-eye; B, an adjustable rod; C, an eyebolt; D, a tail-nut; E, an adjustable handle; F, a runner; G, an eye-clip and eyebolt, and I a thimble-bolt.

Fig. 2 shows an ordinary A-harrow, to which is attached my improvement, which consists of two adjustable handles E E, two adjustable rods B B, eyebolts C C to adjustable rods B B, socket-eyes A A to eyebolts C C, tail-nuts D D for holding eyebolts C C to adjustable rods B B, and eye-clips and eyebolts G G for holding adjustable handles E E to frame.

To operate the device when desiring to change from a working harrow to a movable harrow, loosen the tail-nuts D D and lower the handles E E to rest on the harrow-frame. Then tighten the tail-nuts and invert the harrow, which will change the implement from No. 2 to No. 3.

What I claim as my invention, and desire to secure by Letters Patent, is—

In a harrow, the combination of a frame and teeth, handles each having one end pivoted to the upper side of said frame, runners F, F, secured upon the upper side of said frame, adjustable supporting-rods B, B, having their upper ends pivotally connected with the handles, clamping devices acting upon said rods whereby said handles may be secured in a higher or lower position, the lower ends of said rods passing through said clamping devices, substantially as described.

JOHN B. GILLASPIE.

Witnesses:
R. H. BRIMMER,
J. B. HOUSER.